United States Patent
Perry, Jr. et al.

(10) Patent No.: US 7,392,301 B1
(45) Date of Patent: Jun. 24, 2008

(54) METHOD AND APPARATUS FOR AUTOMATED ASSISTANCE IN CONFIGURING CUSTOMER PREMISES EQUIPMENT

(75) Inventors: William A. Perry, Jr., Addison, TX (US); Robert D. Kehn, The Colony, TX (US); Eric C. Neilson, Dallas, TX (US)

(73) Assignee: Siemens Subscriber Networks, Inc., Dallas, TX (US)

( * ) Notice: Subject to any disclaimer, the term of this patent is extended or adjusted under 35 U.S.C. 154(b) by 830 days.

(21) Appl. No.: 09/712,017

(22) Filed: Nov. 14, 2000

(51) Int. Cl.
*G06F 15/16* (2006.01)
*G06F 15/177* (2006.01)
*H04L 12/26* (2006.01)

(52) U.S. Cl. .................. 709/221; 709/219; 709/227; 709/250; 370/241.1; 370/252

(58) Field of Classification Search ......... 709/217–222, 709/237, 227–229, 250; 370/254–258, 465, 370/241, 241.1, 252
See application file for complete search history.

(56) References Cited

U.S. PATENT DOCUMENTS

| | | | | |
|---|---|---|---|---|
| 5,349,649 A * | 9/1994 | Iijima | ......................... | 709/228 |
| 5,596,723 A * | 1/1997 | Romohr | ...................... | 709/222 |
| 5,655,077 A * | 8/1997 | Jones et al. | ..................... | 726/8 |
| 5,826,017 A * | 10/1998 | Holzmann | .................. | 709/230 |
| 5,848,244 A * | 12/1998 | Wilson | ........................ | 709/221 |
| 5,916,305 A * | 6/1999 | Sikdar et al. | ................. | 709/236 |
| 5,918,016 A * | 6/1999 | Brewer et al. | ................ | 709/220 |
| 5,999,979 A * | 12/1999 | Vellanki et al. | .............. | 709/232 |
| 6,012,088 A * | 1/2000 | Li et al. | ....................... | 709/220 |
| 6,041,166 A * | 3/2000 | Hart et al. | .................... | 709/220 |
| 6,058,421 A * | 5/2000 | Fijolek et al. | ............... | 709/225 |
| 6,105,068 A * | 8/2000 | Naudus | ....................... | 709/228 |
| 6,108,350 A * | 8/2000 | Araujo et al. | ................ | 370/467 |
| 6,118,768 A * | 9/2000 | Bhatia et al. | ................. | 370/254 |
| 6,122,287 A * | 9/2000 | Ohanian et al. | ............. | 370/465 |
| 6,185,701 B1 * | 2/2001 | Marullo et al. | .............. | 709/219 |
| 6,222,820 B1 * | 4/2001 | Hamami | ...................... | 370/218 |
| 6,229,809 B1 * | 5/2001 | Murphy et al. | .............. | 370/401 |
| 6,285,680 B1 * | 9/2001 | Steinka et al. | .............. | 370/431 |
| 6,430,602 B1 * | 8/2002 | Kay et al. | .................... | 709/206 |
| 6,463,477 B1 * | 10/2002 | Fontenot | ..................... | 709/236 |
| 6,636,505 B1 * | 10/2003 | Wang et al. | .................. | 370/352 |
| 6,665,724 B2 * | 12/2003 | Lawrence | .................... | 709/230 |
| 6,717,914 B1 * | 4/2004 | Hamami | ...................... | 370/248 |
| 6,778,505 B1 * | 8/2004 | Bullman et al. | ............. | 370/254 |
| 6,789,111 B1 * | 9/2004 | Brockway et al. | ........... | 709/222 |
| 7,051,087 B1 * | 5/2006 | Bahl et al. | ................... | 709/220 |

OTHER PUBLICATIONS

Droms, "RFC 2131: Dynamic Host Configuration Protocol," Network Working Group, XP002174548, pp. 1-29, Mar. 1997.
Mamakos et al., "RFC 2516: A Method for Transmitting PPP Over Ethernet (PPPoE)," XP002198847, pp. 1-17 <URL:http://www.ietf.org/rfc/rfc2516.txt?number=2516>, Feb. 1999.

(Continued)

*Primary Examiner*—Joseph E. Avellino

(57) ABSTRACT

In one aspect of the invention, a method of providing automated assistance in configuring customer premises equipment for communication with another network element includes automatically identifying a virtual channel and/or a protocol valid for configuration with the customer premises equipment, and assisting a user in configuring the customer premises equipment for use with the identified virtual channel and/or protocol.

17 Claims, 5 Drawing Sheets

OTHER PUBLICATIONS

PCT International Search Report Form PCT/ISA/210, Jun. 7, 2002.
Allan, et al., "ILMI Based Autoconfiguration," ADSL Forum 98-0xx, pp. 1-7, Jun. 16-19, 1998.
Turner, et al., "Auto-Configuration Parameters for ADSL CPE," ADSL Forum 99-304, pp. 1-21, Nov. 1999.
Lederman, et al., "ADSL Network Management & Operations Group," ADSL Forum 99-293, pp. 1-18, Nov. 1999.
Allan, "ATM Architecture Minutes," ADSL Forum 00-035, pp. 1-5, Feb. 8-11, 2000.
Silverman, et al., "Enhancements to the ATM Forum Auto-configuration MIB Client Protocol ID and Failure Trap," ADSL Forum 00.024, pp. 1-13, Feb. 8-11, 2000.
Stark, "Potential Residential Gateway Capabilities," DSL Forum 2000-044, pp. 1-9, Feb. 8-11, 2000.
Allan, "Semi-Permanent PPP Connections ($sP_4$)," ADSL Forum 00-008, pp. 1-5, Feb. 8-11, 2000.
Silverman, "Informational Contribution on Auto-Configuration Contributions," DSL Forum 2000.117, pp. 1-5, May 17-19, 2000.
Silverman, et al., "Signaling Service and VC Changes in the Auto-Configuration MIB," DSL Forum 2000.115, pp. 1-2, May 17-19, 2000.
Silverman, et al., "The 'Layer3Protocol ID', the Auto-Configuration MIB and the Problem of Encapsulation—A Proposal," DSL Forum 2000.118.1, pp. 1-7, May 17-19, 2000.
Hochberg, et al., "Zero Configurable ATU-R," DSL Borum 2000-120, pp. 1-2, May 17-19, 2000.
Young, "Status on VoDSL Issues from WMOA and NM Working Groups," ATM Forum/00L-0027, pp. 1-2, Aug. 22, 2000.
Gili, "OpenDSL: DSL CPE Automatic Configuration," DSL Forum 2000.237, pp. 1-196, Aug. 29-Sep. 1, 2000.
Turner, "DSL Forum DSL CPE Auto-Configuration," WT-048, pp. 1-21, Sep. 24, 2000.
Claes, "Proposal for Auto-Config Transport Mechanisms," DSL Forum Contribution 2000.313, pp. 1-9, Oct. 2, 2000.
"CPE Autoconfiguration Interim Meeting," DSL Forum, pp. 1-13, Oct. 4, 2000.
"The Auto-Configuration Architecture," DSL Forum Contribution 2000-304/306, Oct. 4, 2000.
Allan, et al., "The Auto-Configuration Architecture," DSL Forum 2000-0304, pp. 1-12, Oct. 4, 2000.
Nelson, "Proposed Auto-Configuration Architecture Baseline Text," DSL Forum 2000.306, pp. 1-10, Oct. 4, 2000.
Nelson, et al., "Proposed Auto-Configuration Architecture Baseline Text," DSL Forum 2000-0306, pp. 1-9, Oct. 4, 2000.
"Use of DHCP for Auto-Configuration," DSLF Contribution 2000-309, pp. 1-30, Oct. 4, 2000.
Allan, et al., "Use of DHCP for Auto-Configuration," DSL Forum Contribution 2000-309, pp. 1-13, Oct. 4, 2000.
Silverman, et al., "Scope of Auto-Configuration Effort," Contribution 2000-310, pp. 1-10, Oct. 4, 2000.
Silverman, et al., "Scope of Activities for the Auto-Configuration Working," DSL Forum 2000-310, pp. 1-5, Oct. 4, 2000.
"Auto-Configuration Definition," DSL Forum 2000-311, pp. 1-11, Oct. 4, 2000.
Agmon, et al., "Layers 2 and 3 Configuration," DSL Forum 2000-311, pp. 1-8, Oct. 4, 2000.
Turner, "CPE Auto-Configuration Issues & Requirements," DSL Forum 2000-312, pp. 1-5, Oct. 4, 2000.
Aken, et al., "Proposal for Auto-Configuration Transport Mechanisms," DSL Forum 2000.313.1, pp. 1-12, Oct. 4, 2000.
Trumbo, et al., "Rules of Engagement for Auto-Configuration Recommendations," DSL Forum 2000-315, pp. 1-18, Oct. 4, 2000.
Trumbo, et al., "Rules of Engagement for Auto-Configuration Recommendations," DSL Forum 2000-315, pp. 1-13, Oct. 4, 2000.
Silverman, "Baseline Text Document for Auto-Configuration of PVCs MIB Extension Addendum," btd-nm-ilmi-auto-01.02, pp. 1-35, Oct. 15-20, 2000.
"Basic Service Auto-Configuration Architecture Baseline Text," DSL Forum 2000.332, Oct. 23, 2000.
Agmon, et al., "Auto-Configuration Framework," DSL Forum 2000-331, pp. 1-11, Nov. 2, 2000.
Stephens, "Minutes of the CPE Auto-Configuration Meeting," DSL Forum 2000.343, pp. 1-3, Nov. 2, 2000.
Gili, "Straw Ballot Vote for WT-048v3," DSL Forum 2000.352, pp. 1-3, Nov. 8, 2000.
Agmon, "Straw Ballot Vote for WT-048v3," DSL Forum 2000.355, pp. 1-3, Nov. 16, 2000.
Way, "Straw Ballot Vote for WT-048v3," DSL Forum 2000.358, p. 1, Nov. 21, 2000.
Haag, "Deutsche Telekom Straw Ballot Votes for WT-048v3," DSL Forum 2000.377, pp. 1-2, Nov. 23, 2000.

* cited by examiner

METHOD AND APPARATUS FOR AUTOMATED ASSISTANCE IN CONFIGURING CUSTOMER PREMISES EQUIPMENT

TECHNICAL FIELD OF THE INVENTION

The present invention relates to the field of communication systems, and more particularly to a system and method for providing automated assistance in configuring customer premises equipment.

BACKGROUND OF THE INVENTION

Various customer premises equipment has been developed to facilitate access to numerous network communication and processing services. For example, modems, routers, and bridges can facilitate access to network services through various central office equipment. Typically, customer premises equipment must be configured to interact with various other network elements both in terms of the logical signal connection—or virtual channel—between the customer premises equipment and the service provider, and in terms of the encapsulation protocol used by the service provider.

Unfortunately, different network service providers offer services using several different protocols on any number of possible signal paths. Currently, no uniform standard specifying applicable signal paths or protocols has been established for service provision to customer premises equipment. As a result, configuration of customer premises equipment to operate with any particular service provider's network equipment can prove a time consuming and frustrating task for users of the customer premises equipment.

Some manufacturers of customer premises equipment have included predefined look-up tables with their equipment to assist users in configuring the customer premises equipment. This approach suffers for several reasons. For example, the predefined tables quickly become outdated as new service providers emerge and existing service providers vary the virtual channels and/or protocols supported. As a result, the predefined tables can be outdated before the product is even sold to the customer. In addition, these approaches require the user to input information used to cross-reference the configuration information in the look-up tables. This provides another chance for user error and/or system inoperability if the user does not have the required cross-reference information.

SUMMARY OF THE INVENTION

The present invention recognizes a need for a method and apparatus operable to provide automated assistance in configuring customer premises equipment. In accordance with the present invention, a system and method for providing automated assistance in configuring customer premises equipment are provided that substantially reduce or eliminate at least some of the shortcomings associated with prior approaches.

In one aspect of the invention, a method of providing automated assistance in configuring customer premises equipment for communication with another network element comprises automatically identifying a virtual channel and/or a protocol valid for configuration with the customer premises equipment. The method further comprises assisting a user in configuring the customer premises equipment for use with the identified virtual channel and/or protocol.

In another aspect of the invention, an apparatus operable to provide automated assistance in configuring customer premises equipment comprises a configuration manager operable to automatically identify a virtual channel and/or a protocol valid for configuration with the customer premises equipment. The apparatus further comprises a memory accessible to the configuration manager and operable to store an identifier of a valid virtual channel based on the response to the probing configuration signal.

In still another aspect of the invention, a method of providing automated assistance in configuring customer premises equipment for communication with another network element comprises communicating over a virtual channel and toward a destination network element a probing configuration signal. The method further comprises receiving over the virtual channel a response to the configuration signal, and identifying as valid for configuration the virtual channel and/or protocol associated with the response.

Depending on the specific features implemented, particular embodiments of the present invention may exhibit some, none, or all of the following technical advantages. One aspect of the present invention provides automated assistance in configuring and/or performing diagnostics testing of customer premises equipment communicating with various other network elements. In one aspect of operation, the invention facilitates automatic identification of a virtual channel and/or protocol valid for configuration with the customer premises equipment. The invention may optionally identify a valid virtual channel and/or protocol without requiring any user input, or without requiring user input associated with the valid virtual channel or protocol. One aspect of the invention reduces or eliminates the need for predetermined look-up tables that may become stale or require user input for cross-referencing purposes.

The invention can be used to provide a user a defined set of valid options for configuration, or can be used to automatically configure the customer premises equipment with little or no user input required.

Through a series of optional features, the invention can provide additional significant time savings in configuring customer premises equipment. For example, the invention can begin by searching a subset of virtual channels likely to provide a response to a probing configuration signal. If a valid virtual channel and/or protocol is discovered through this step, the equipment can be configured almost instantly. Another optional feature allows investigation of multiple virtual channels at or near the same time by simultaneously spawning multiple threads, each operable to investigate a particular virtual channel.

Still additional time savings can be realized by sending a first group of probing configuration signals over one or more virtual channels and, before the expiration of a time-out value associated with a first group of probing configuration signals, sending a second group of probing configuration signals over the same virtual channels. Another feature of the invention that can be implemented to achieve further efficiency advantages is the communication of multiple probing configuration signals back-to-back, or with only small delays there between. This facilitates investigating multiple protocols over one or more virtual channels at or near the same time.

In another aspect of operation, the invention provides automated diagnostic information regarding various layers of network connectivity. This information can be presented to a user to facilitate fault detection and/or repair.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
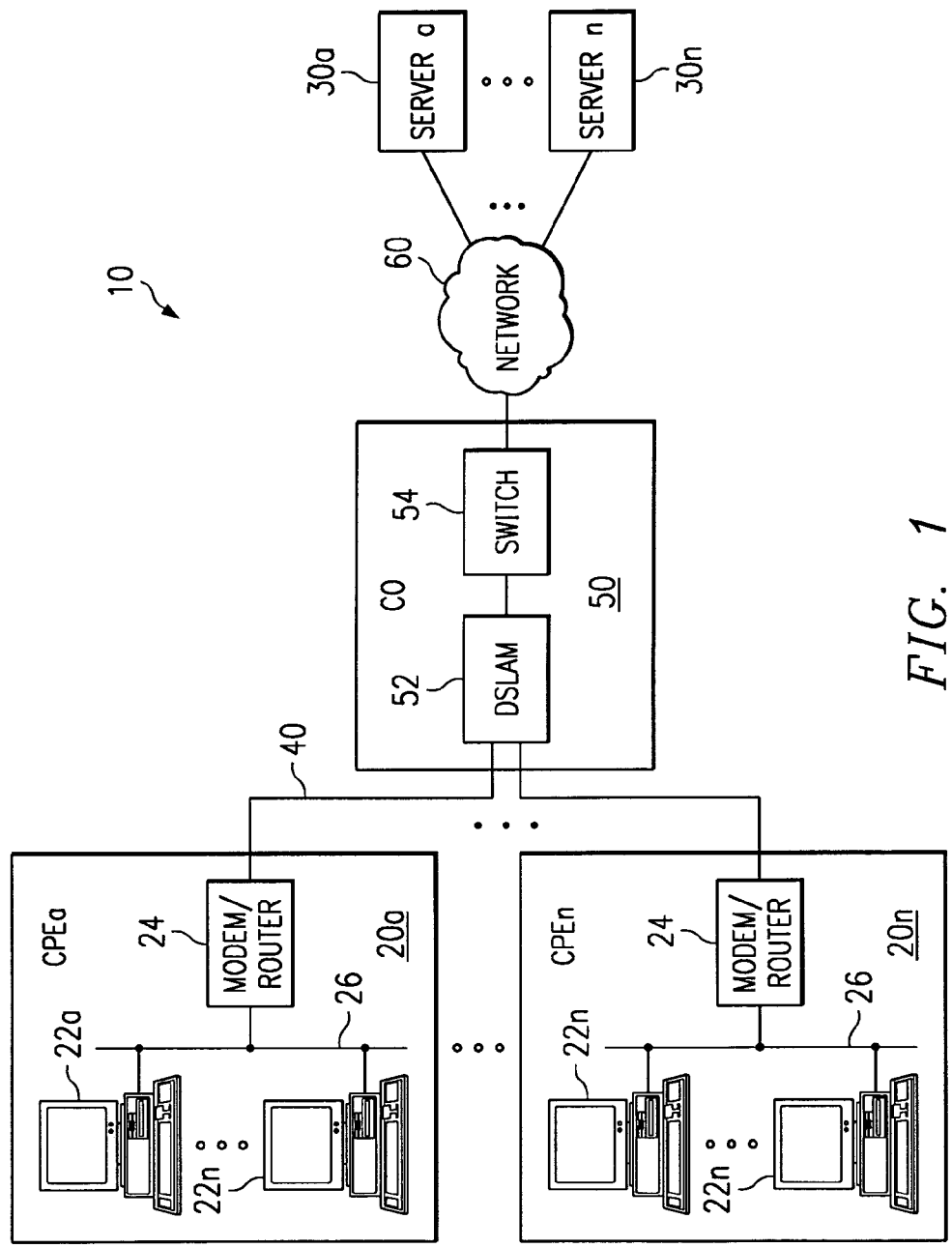
FIG. 1 is a block diagram of an exemplary embodiment of a system useful in providing automated assistance in configuring a modem according to the teachings of the present invention.

FIG. 1 is a block diagram of an exemplary embodiment of a system 10 useful in providing automated assistance in configuring customer premises equipment 20a-20n to facilitate communication with other network elements, such as servers 30a-30n.

In the illustrated embodiment, customer premises equipment 20 communicates with servers 30a-30n through a communications link 40, central office ("CO") equipment 50, and one or more networks 60. Customer premises equipment 20 may include various hardware, software, and/or firmware, or combinations thereof operable to manage communications to and from customer premises equipment 20. In the illustrated embodiment, customer premise equipment 20 includes one or more hosts 22a-22n, which include or are coupled to one or more modems 24 through a communication link 26.

Throughout this document, the terms "couple" and "coupled" refer to any direct or indirect communication between two or more elements in system 10, whether or not those elements are in physical contact with one another. Also, throughout this document, the term "communication link" refers to any suitable wireless and/or wireline, electrical and/or optical based system that supports communication between network elements using ground-based and/or space-based components.

Each of hosts 22 may comprise, for example, a workstation, a mainframe computer, a miniframe computer, a desktop computer, a laptop computer, a personal digital assistant, or any other computing or communicating device. In operation, host 22 may execute with any of the well-known MS-DOS, PC-DOS, OS-2, MAC-OS, WINDOWS™, UNIX, or other appropriate operating systems.

Throughout this document, the term "modem" is used to describe any hardware, software, firmware, or combination thereof, operable to facilitate an interface between one or more host devices 22 and network elements external to customer premises equipment 20, such as central office equipment 50. In a particular embodiment, modem 24 could also facilitate routing, bridging, and/or switching functionality between a one or more hosts 22 and other external network elements.

In the example shown in FIG. 1, one modem 24 services a plurality of hosts 22. Alternatively, one or more hosts 22 could each couple to or include its own modem 24 for interfacing external network elements. In the illustrated embodiment, modems 24 reside externally to hosts 22. Alternatively, all or a portion of the functionality of modem 24 could reside internally to host 22.

In the example shown in FIG. 1, communication link 26 coupling hosts 22 and modem 24 comprises a local area network, such as an Ethernet. Other communication media, configurations, and/or protocols could be used without departing from the scope of the invention. For example, modem 24 could communicate with a host 22 over a universal serial bus ("USB") or a peripheral component interconnect ("PCI") bus.

In the illustrated embodiment, customer premises equipment 20 communicates with central office equipment over a communication link 40. Communication link 40 may comprise any of a variety of communication media or combination of communications media, such as a twisted pair, an optical fiber, and/or a wireless communication path. As one particular example, communication link 40 could comprise a digital subscriber line ("DSL") using any of a variety of xDSL protocols, such as Asymmetric DSL ("ADSL"), G.Lite, Symmetric DSL ("SDSL"), ISDN DSL ("IDSL"), High-Bit-Rate DSL ("HDSL"), Very High-Bit-Rate DSL ("VDSL"), or Voice Over DSL ("VDSL"). Other variations of these protocols may be developed in the future. The invention is intended to encompass all current and future variations of these and other protocols.

In this particular example, customer premises equipment 20 communicates with central office equipment 50 over an xDSL link. Central office equipment 50 comprises equipment operable to facilitate communication between one or more elements of customer premises equipment and an external network, such as network 60.

In the illustrated embodiment, central office equipment 50 includes one or more digital subscriber line access multiplexers ("DSLAM") 52 and one or more central office switches 54. DSLAM 52 receives signals from communication links 40 and passes consolidated signals to a central office switch 54. Central office switch 54 directs communication of signals between DSLAMs 52 and one or more networks 60. Other central office equipment, such as a digital loop carrier, could also be implemented consistent with the present invention.

Networks 60 may comprise, for example, a data network, a public switched telephone network (PSTN), an integrated services digital network (ISDN), a local area network (LAN), a wide area network (WAN), or other communication systems or combination of communication systems at one or more locations. Networks 60 may comprise wireless networks, wireless networks, or a combination of wireless and wireline networks. Networks 60 may support, for example, cell based protocols, such as the asynchronous transfer mode ("ATM") or Frame Relay protocols, and/or packet based protocols, such as the Transmission Control Protocol/Internet Protocol ("TCP/IP") or the User Datagram Protocol ("UDP").

Depending on the type of network or combination of networks residing between customer premises equipment 20 and server 30, communication between these network elements may use any of a variety of signal paths and protocols. To facilitate communication between customer premises equipment 20 and elements coupled to customer premises equipment 20 through networks 60, customer premises equipment 20 should be configured to operate with the protocols and signal paths utilized within each network 60. Therefore, at some point prior to or during operation, customer premises equipment 20 should be configured to recognize the logical signal path and/or communications protocol used within networks 60.

For example, where system 10 implements permanent virtual channels or circuits ("PVC"), it is advantageous to configure customer premises equipment 20 with the permanent virtual path and/or channel established between the customer premises equipment and another network element in the communication path. Similarly, it is advantageous to configure customer premises equipment 20 with the protocol used on the paths to ensure interoperability between the customer premises equipment and other network elements communicating using that protocol.

Various service providers have configured network services using numerous different virtual channels and various protocols. Users of customer premises equipment face the challenge of discovering the network characteristics of selected service providers to facilitate configuring the customer premises equipment for use with the selected service providers. One aspect of the present invention automatically discovers network characteristics and provides automated assistance in configuring customer premises equipment. For example, customer premises equipment 20 may determine an active virtual channel and/or a protocol without prompting the user for any information at all; or customer premises equipment 20 may discover the active virtual channel and protocol without prompting the user for information identifying the virtual channel or protocol. Customer premises equipment 20 may reduce or eliminate the need for use of predefined look-up tables to identify the valid virtual channel and/or protocol.

Customer premises equipment 20 may use the discovered information to automatically configure the modem for use with that virtual channel and/or protocol or present the user options for configuring the modem. Another aspect of the invention provides automated fault diagnostics regarding the customer premises equipment.

In one aspect of operation, customer premises equipment 20 takes steps to learn about some or all of the communication links coupling customer premises equipment 20 to other network elements, such as servers 30, and uses that information to provide automated assistance in configuring customer premises equipment 20 for communication with those network elements. To discover network characteristics and aid in the configuration process, customer premises equipment 20 can communicate a probing configuration signal over one or more virtual circuits or channels.

In one particular example, the probing configuration signal may comprise, for example, an F5 Operations, Administration, and Maintenance ("OAM") loopback signal. Virtual circuits returning a confirming configuration signal are identified as active virtual circuits. Based on that information, customer premises equipment 20 can provide automated assistance in configuration with at least one of the identified active virtual circuits.

As a further example, the probing configuration signal may comprise a self-configuring protocol signal, such as a Dynamic Host Configuration Protocol ("DHCP") request or a Link Control Protocol Configuration Packet ("LCP"). Based on signals received in response to self-configuring protocol signals, customer premises equipment 20 can identify not only the appropriate virtual channels, but also the protocol scheme used by each identified virtual channel. Customer premises equipment 20 may then provide automated assistance in configuration with at least one of the identified protocols on the associated virtual channel.

In another mode of operation, customer premises equipment 20 may communicate one or more diagnostic signals toward a destination network element to ensure connectivity at various network layers between host 22 and a destination network element, such as server 30. The diagnostic signals may comprise, for example, Packet InterNet Groper ("PING") signals, Domain Name Server ("DNS") resolution requests, Hyper Text Transfer Protocol ("HTTP") requests, or any other signal that can be communicated toward a destination device to probe the connectivity of various network layers. Using signals received in response to the diagnostic signals, customer premises equipment 20 can provide, for example, trouble-shooting services to users of system 10.

Figure 2:
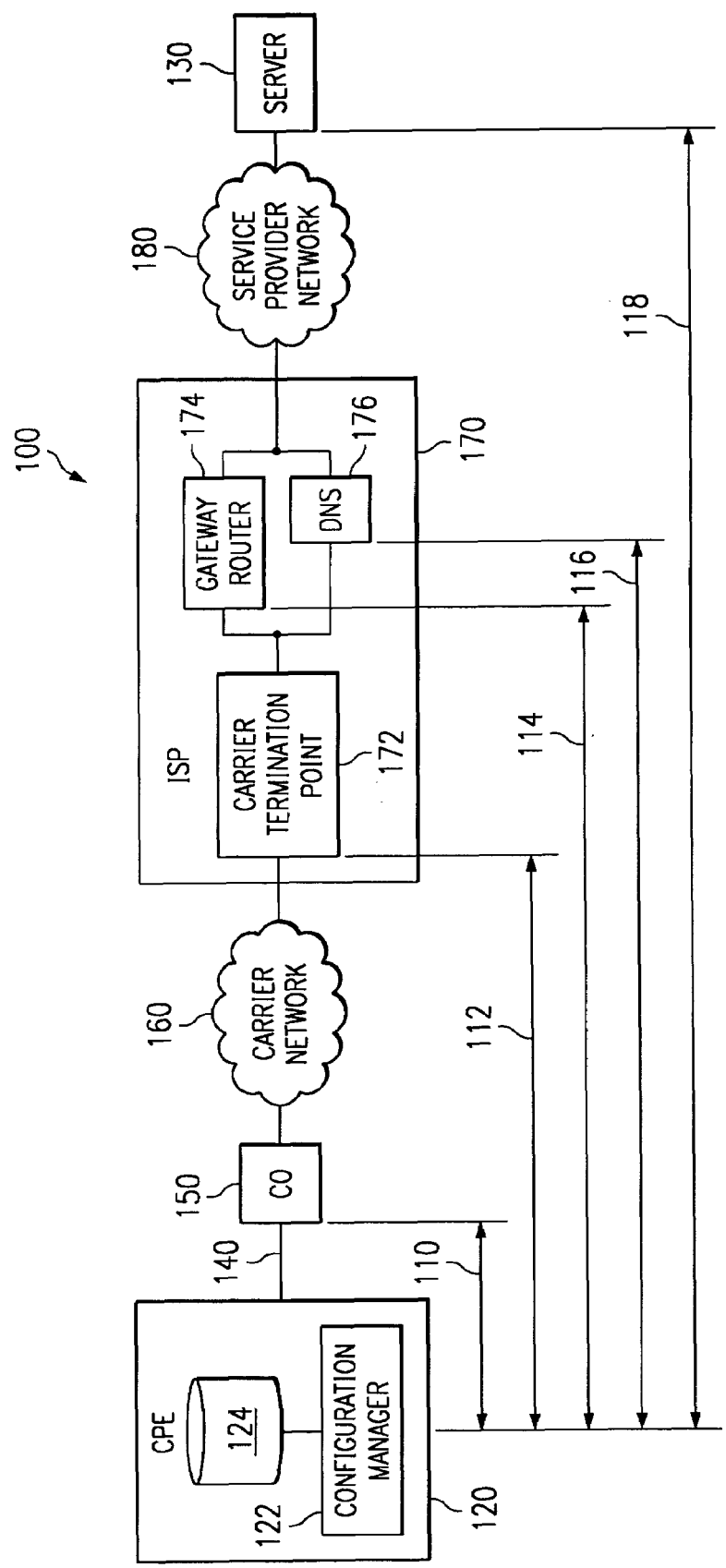
FIG. 2 is a block diagram of another embodiment of a system useful in providing automated assistance in configuring customer premises equipment according to the teachings of the present invention.

FIG. 2 is a block diagram of another embodiment of a system 100 useful in providing automated assistance in configuring and/or diagnosing faults associated with customer premises equipment 120. System 100 includes one or more elements of customer premises equipment 120 coupled to central office equipment 150 over a communication link 140. Customer premises equipment 120, central office equipment 150, and communication link 140 shown in FIG. 2 can be similar in structure and function to customer premises equipment 20, central office equipment 50, and communication link 40, respectively, shown in FIG. 1. Although FIG. 2 shows a single block of customer premises equipment 120 and a single block of central office equipment 150, system 100 may include any number of elements of customer premises equipment and central office equipment.

Customer premises equipment 120 communicates with one or more other network elements, such as, server 130. In the illustrated embodiment, customer premises equipment 120 communicates with server 130 through a carrier network 160 and a service provider network 180. Carrier network 160 may comprise, for example, a backbone network coupling central office equipment 150 to other networks. In a particular embodiment, carrier network 160 comprises an asynchronous transfer mode optical backbone. Other communication media, configurations, and/or signaling protocols can be used without departing from the scope of the invention.

Service provider network 180 may comprise, for example, a global computer network such as the Internet. In the illustrated embodiment, Internet service provider ("ISP") 170 provides an interface between carrier network 160 and service provider network 180. In this embodiment, Internet service provider 170 includes carrier termination equipment 172, a gateway router 174, and a domain name server ("DNS") 176. Although carrier termination equipment 172, gateway router 174, and domain name server 176 are depicted as residing in Internet service provider 170, one or more of these elements could alternatively reside at various other locations within the network without departing from the scope of the invention. In addition, features described with respect to particular ones of these elements could alternatively be delivered by another of these elements, or combined into fewer elements than described here.

Carrier termination equipment 172 may perform signal format conversion where carrier network 160 and service provider network 180 utilize different protocols. For example, signals on carrier network 160 may comprise cell-based signals, such as asynchronous transfer mode signals or frame relay signals. Service provider network 180 may traffic, for example, packet based signals such as signals based on the Transmission Control Protocol/Internet protocol ("TCP/IP"). In a particular example, carrier termination equipment 172 may receive asynchronous transfer mode cells from carrier network 160 and assemble information from those cells into Internet protocol packets for transmission over a service provider network 180. Likewise, carrier termination equipment 172 may receive Internet protocol packets from service provider network 180 and assemble information from those packets into asynchronous transfer mode cells for transmission over carrier network 160. Asynchronous transfer mode cells and Internet protocol packets are intended only as examples of the types of protocols utilized by system 100. Other protocols and/or combinations of protocols could be utilized without departing from the invention.

Gateway router 174 provides an interface to service provider network 180. Gateway router 174 may, for example, receive traffic from carrier network 160 and determine a logical path through service provider network 180 to a destination network element, such as, server 130. Similarly, gateway router 174 may provide routing, bridging, and/or switching functions for signals received from service provider network 180 destined for particular customer premises equipment 120 through carrier network 160.

Domain name server 176 operates to store information about domains, subdomains, and hosts within service provider network 180. Domain name server 176 responds to domain name resolution requests by determining IP addresses from a given domain name.

Customer premises equipment 120 includes a configuration manager 122. Configuration manager 122 may reside, for example, as part of a modem or a host at customer premises equipment 120. Configuration manager 122 operates to examine various aspects of system 100 to assist in automatically configuring customer premise equipment 120 for communication with other network elements, such as, server 130. For example, configuration manager 122 may determine an active virtual channel and/or a protocol without prompting the user for any information at all; or configuration manager 122 may discover the active virtual channel and protocol without prompting the user for information identifying the virtual channel or protocol. Customer premises equipment 120 may reduce or eliminate the need for use of predefined look-up tables to identify the valid virtual channel and/or protocol.

Customer premises equipment 120 may use the discovered information to automatically configure the modem for use with that virtual channel and/or protocol or present the user options for configuring the modem. In addition, configuration manager 122 may also provide diagnostic information for use in troubleshooting operational difficulties with customer premises equipment 120.

Configuration manager 122 has access to a memory 124. Memory 124 may comprise any storage medium or media and may include any of a variety of data structures, arrangements, and/or compilations operable to store and facilitate retrieval of various information stored within memory 124. Although memory 124 is shown as residing within customer premise equipment 120, memory 124 could reside at any location accessible to configuration manager 122.

In operation, configuration manager 122 may test the physical connection of communication link 140 by determining whether a tone 110 exits on communication link 140. If no tone 110 exists, configuration manager 122 may, for example, store an indication of a physical layer fault, and/or provide an instruction aiding a user in analyzing and/or eliminating the fault at the physical layer.

Configuration manager 122 may also test the carrier network layer by communicating a probing configuration signal 112 toward carrier termination equipment 172 over one or more virtual channels. For example, configuration manager 122 may communicate F5 OAM loop back signals over one or more virtual channels and await a response. If the configuration manager 122 receives one or more responses to probing configuration signal 112, configuration manager 122 may mark the virtual channels carrying the responses in memory 124 as valid virtual channels appropriate for configuration with customer premise equipment 120.

Probing configuration signal 112 could also, or in the alternative, include a self-configurating protocol signal, such as a DHCP request or an LCP signal. If configuration manager 122 receives an anticipated response to one of these signals over one or more virtual channels, configuration manager 122 may mark the virtual channel carrying the response as a valid virtual channel for configuration of customer premise equipment 120. In addition, configuration manager 122 may mark the protocol associated with the response to the probing configuration signal 112 as a valid protocol for configuration of customer premise equipment 120. Based on the response signals, configuration manager 122 can provide automated assistance in configuring customer premise equipment 120 for operation using a valid virtual channel and protocol.

As a particular example of a probing configuration signal that can be used to determine both an appropriate virtual channel and a protocol for configuration of customer premises equipment 120, probing configuration signal 112 may comprise a DHCP DISCOVER message. This probing configuration signal allows for detection of, for example, a Bridged 1483 protocol. In a particular example, the "xid" field of the DHCP DISCOVER message is set to:

"0x00, 0x20, 0xEA, 0x00."

In that case, when configuration manager 122 receives a response to probing configuration signal 112: it examines the first three bytes of the response for the pattern "0xAA, 0xAA, 0x03;" it ensures that bytes sixteen through twenty one (zero-based offset) of the response pattern are not equal to the pattern "0x00, 0x20, 0xEA, 0x00, 0xCD, 0x0d;" it checks the twenty second and twenty third bytes of the response for the pattern "0x08, 0x00;" and it checks the "xid" field of the response for the pattern "0x00, 0x20, 0xEA, 0x00."

If these patterns are recognized, configuration manager 122 marks Bridged 1483 as a valid protocol on the associated virtual channel, and may automatically configure the customer premises equipment to operate using that protocol and virtual channel. Other messages and expected response patterns could be used without departing from the present invention.

As a further example, probing configuration signal 112 could comprise a Point-to-Point over Ethernet ("PPPoE") PADI packet, which could be used to identify the use of a PPPoE protocol. The following is an example of such a packet:

0xAA, 0xAA, 0x03, 0x00, 0x80, 0xC2,
0x00, 0x07, 0x00, 0x00, 0xFF, 0xEF,
0xFF, 0xFF, 0xFF, 0xFF, 0x00, 0x20,
0xEA, 0x00, 0xCD, 0x0D, 0x88, 0x63,
0x11, 0x09, 0x00, 0x00, 0x00, 0x0A,
0x01, 0x03, 0x00, 0x02, 0x00, 0x42,
0x01, 0x01, 0x00, 0x00, 0x00, 0x00,
0x00, 0x00, 0x00, 0x00, 0x00, 0x00,
0x00, 0x00, 0x00, 0x00, 0x00, 0x00,
0x00, 0x00, 0x00, 0x00, 0x00, 0x00,
0x00, 0x00, 0x00, 0x00, 0x00, 0x00,
0x00, 0x00, 0x00, 0x00.

Configuration manager 122 determines whether the PPPoE protocol is active on a particular virtual channel by examining the first three bytes of a response to this signal for the pattern "0xAA, 0xAA, 0x03;" bytes ten through fifteen (zero-based offset) for the pattern "0x00, 0x20, 0xEA, 0x00, 0xCD, 0x0D;" and the twenty second and twenty third (zero-based offset) bytes for the pattern "0x88, 0x63." If these patterns are recognized, configuration manager 122 marks PPPoE as a valid protocol on the associated virtual channel, and may automatically configure customer premises equipment 120 to operate using that protocol and virtual channel. Other messages and expected response patterns could be used without departing from the present invention.

Configuration manager 122 can also detect various versions of the Point-to-Point over ATM (PPPoA) protocol using probing configuration signals. For example, configuration manager 122 may communicate an RFC 1661 PPP LCP Configure Request signal to detect a PPP VCMUX protocol. As a particular example, configuration manager 122 may communicate the following Configure-Request signal:

```
0xC0, 0x21, 0x01, 0xD1, 0x00, 0x0E,
0x05, 0x06, 0x00, 0x03, 0x7F, 0xB6,
0x07, 0x02, 0x08, 0x02.
```

Configuration manager 122 determines that the PPP VCMUX protocol is active on a particular virtual channel by examining the first four bytes of the response packet for the pattern "0xC0, 0x21." In another embodiment, configuration manager 122 examines incoming signals until it locates the desired pattern, such as 0xC0, 0x21, and then examines the following bytes to determine a match. Upon recognition of an appropriate response signal, configuration manager 122 may mark the PPP VCMUX protocol and the associated virtual channel as valid, and may automatically configure customer premise equipment 120 for operation in using the identified virtual channel and protocol. Other probing signals and expected response patterns could be used without departing from the present invention.

In a similar manner, configuration manager 122 may detect a Point-to-Point Logical Link Control ("PPP LLC") protocol using, for example, the following PPP LCP Configure Request signal:

```
0xFE, 0xFE, 0x03, 0xCF, 0xC0, 0x21,
0x01, 0xD3, 0x00, 0x0E, 0x05, 0x06,
0x00, 0x03, 0x7F, 0xB6, 0x07, 0x02,
0x08, 0x02.
```

In that case, configuration manager 122 examines the first six bytes of the response to probing configuration signal 112 looking for the pattern "0xFE, 0xFE, 0x03, 0xCF, 0xC0, 0x21." In another embodiment, configuration manager 122 examines incoming signals until it locates the desired pattern, and then examines the following bytes to determine a match. Upon recognition of appropriate response signals, configuration manager 122 can mark the virtual channel carrying the response and the protocol of that signal as valid, and may automatically configure customer premises equipment 120 for operation using the identified virtual channel and protocol. Other probing signals and expected response patterns could be used without departing from the present invention.

The foregoing discussion of particular examples of probing configuration signals 110 and 112 and confirming responses is intended for illustrative purposes only. The present invention is not intended to be limited to the use of only those signals or only the protocols associated with those signals. The invention applies to communication of any signal that can elicit a response useful in determining a virtual channel and/or a protocol associated with the probing configuration signal or the response thereto.

In addition to or instead of determining the virtual channel and/or protocol for use with customer premise equipment 120, configuration manager 122 can communicate various network layer signals 114-118 to confirm operation of or diagnose trouble spots within system 100. For example, configuration manager 122 can communicate a PING signal toward gateway router 174 to test the IP layer of system 100. If gateway router 174 returns, for example, an IP address to configuration manager 122 in response to the PING signal, configuration manager 122 has determined successful IP layer connectivity. If gateway router 174 does not response, configuration manager 122 can provide an indication of a fault at the IP layer of system 100.

In a similar manner, configuration manager 122 may communicate a DNS resolution request 116 toward domain name server 176. If configuration manager 122 receives a domain name resolution from domain name server 176, it has confirmed proper operation of the transmission control protocol layer of system 100. If configuration manager 122 receives no response to its DNS resolution request signal 116, it may provide an indication of a fault associated with the transmission control protocol layer of system 100.

Configuration manager 122 may also test the application layer of system 100 by communicating, for example, a hypertext transmission protocol ("HTTP") request 118 to server 130 or a well known Internet site. If configuration manager 122 receives a response, it has confirmed application layer connectivity. If, on the other hand, configuration manager 122 does not receive a response, it may provide an indication of a fault associated with the application layer of system 100.

Figure 3:
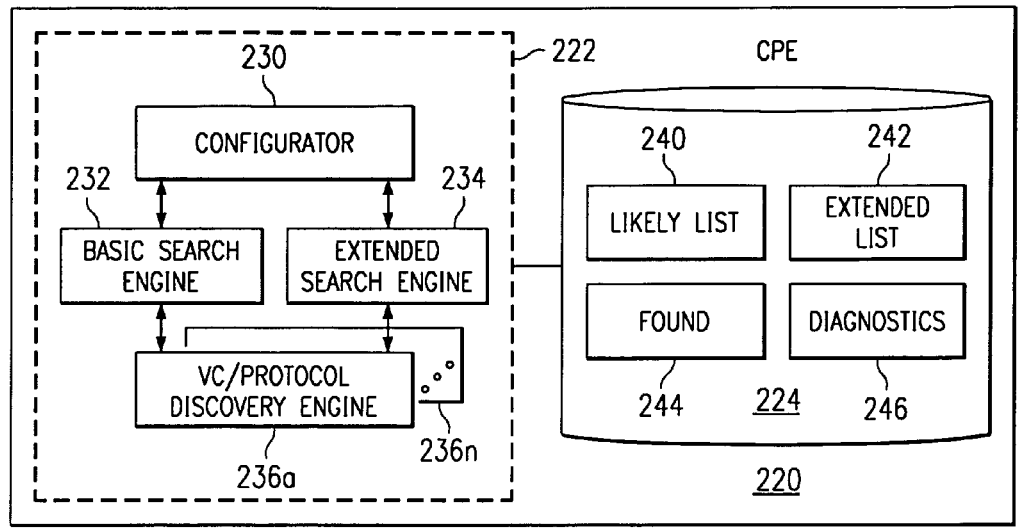
FIG. 3 is a block diagram of one embodiment of at least a portion of customer premises equipment including a configuration manager useful in providing automated assistance in configuring customer premises equipment according to the teachings of the present invention.

FIG. 3 is a block diagram of one embodiment of at least a portion of customer premises equipment 220 including a configuration manager 222 useful in providing automated assistance in configuring customer premises equipment 220. Items depicted within the dotted lines of configuration manager 222 are intended to describe functionality occurring within configuration manager 222. The division of functionality within configuration manager 222 into separate functional blocks 230-236 is used for ease of description only. The invention is not intended to be limited to any particular division of functionality within configuration manager 222.

In the example described in FIG. 3, configuration manager includes a configuration 230, which initiates the configuration and/or diagnostic functions, manages those functions, and reports results of those functions. Configuration 230 may comprise hardware, software, firmware, or any combination thereof. In a particular embodiment, configuration manager 222 includes a basic search engine 232 and an extended search engine 234. Basic search engine 232 reads a list 240 of virtual channels and protocols that are likely to return a valid response.

In a particular example, list 240 may include the following virtual channel identifiers:
VPI=0, VCI=35
VPI=8, VCI=35
VPI=0, VCI=32
VPI=0, VCI=100
VPI=0, VCI=38

VPI=0, VCI=50
VPI=0, VCI=67
VPI=1, VCI=1

The invention recognizes that these virtual channels may be more likely to return a response to a probing configuration signal. List 240 could comprise other or additional virtual channels without departing from the present invention.

Basic search engine 232 checks each virtual channel on list 240 of likely virtual channels to determine if it is a valid virtual channel for configuration with customer premise equipment 220. In a particular embodiment, configurator 230 initiates basic search engine 232, which reads list 240 of virtual channels and protocols likely to elicit a response, and passes that information to virtual channel/protocol discovery engine 236. Virtual channel/protocol discovery engine 236 communicates probing configuration signals toward destination network elements and awaits a response. Basic search engine 232 keeps a record of discovered valid virtual channels and/or protocols and passes that list to configurator 230. Configurator 230 may store valid virtual channels and/or protocols in a found file 244 in memory 224, and may automatically configure customer premise equipment for use with valid virtual channels and/or protocols.

If no valid virtual channels or protocols are discovered using basic search engine 232, configurator 230 may call an extended search engine 234 to perform additional configuration searches. For example, extended search engine 234 may retrieve a set of virtual channels and/or protocols from an extended list 242 in memory 224. Extended list 242 may include, for example, a list of all virtual channels currently in use, which can be partitioned into any appropriate subgroups. For example, extended list 242 may comprise the following groups of virtual channel identifiers to be searched in the following order:

VPI=0, VCI=32-255;
VPI=8, VCI=32-255;
Remainder of VPIs for VCI=32-255;
VPI=0, VCI=256-512;
VIP=9, VCI=256-512;
Remainder of VPIs for VCI=256-512.

Other orders of searching could be used consistent with the present invention. In addition, system 10 could terminate the search at any time in response to, for example, a user input directing termination of the search.

Extended search 234 passes a group of virtual channels and/or protocols to virtual channel/protocol discovery engine 236. Virtual channel/protocol discovery engine attempts to identify valid virtual channels and/or protocols by communicating probing configuration signals over the identified virtual channels and awaiting responses. Extended search engine 234 may keep a list of all identified valid virtual channels and/or protocols, and pass that list to configurator 230 for storage in found file 244 of memory 224 and/or automatic configuration of customer premise equipment 220.

Search engine 232 and/or 234 may check one protocol at a time, or, in a particular embodiment, basic search engine 232 and/or extended search engine 234 may spawn multiple threads of virtual channel/protocol discovery engine 236a-236n. For example, search engines 232-234 may spawn one thread of virtual channel/protocol discovery engine 236 for each virtual channel to be investigated. In this way, search engines 232-234 can determine the validity of multiple virtual channels and/or protocols approximately simultaneously. This feature can increase the speed of the configuration process dramatically.

In another aspect of operation, configurator 230 may call basic search engine 232 or extended search engine 234 to access diagnostics file 246. Search engines 232 and/or 234 generate or retrieve from diagnostics file 246 diagnostic signals, and pass those signals to virtual channel/protocol discovery engine 236. Virtual channel/protocol discovery engine 236 communicates diagnostic signals, such as PINGS, DNS resolution requests, and HTTP requests toward destination elements. Virtual channel/protocol discovery engine 236 receives various responses to the diagnostic signals, and reports those responses to search engines 232-234 and configurator 230. Based on the diagnostic signals, configurator 230 can identify faults in various layers of connectivity between customer premise equipment 230 and the destination network element. Configurator 230 may store these results in diagnostics file 246, and/or may report on various faults detected.

In a particular embodiment, configuration manager 222 communicates one probing configuration signal or diagnostic signal over a particular virtual channel, and then communicates a second probing configuration signal or diagnostic signal over the same virtual channel before a time out value associated with the probing or diagnostic signal has expired. For example, configuration manager 222 may communicate the second signal after one half of the time out value associated with the signal has expired. In this manner, configuration manager 222 can insure that any responses it may expect relating to the first signal are received before communicating the second signal, while at the same time reducing latency that would otherwise be associated with waiting the entire time out before communicating the second signal. This feature advantageously enhances the speed of the system.

Figure 4A:
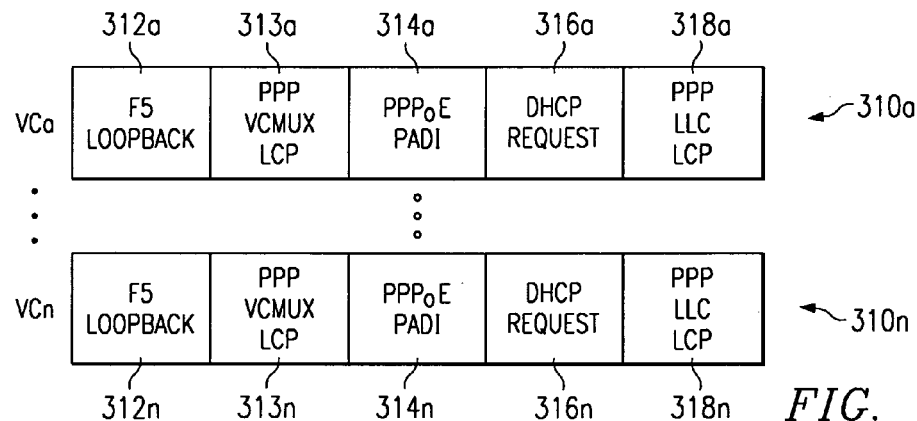
FIGS. 4a-4b are block diagrams of exemplary signals constructed according to the teachings of the present invention.
Figure 4B:
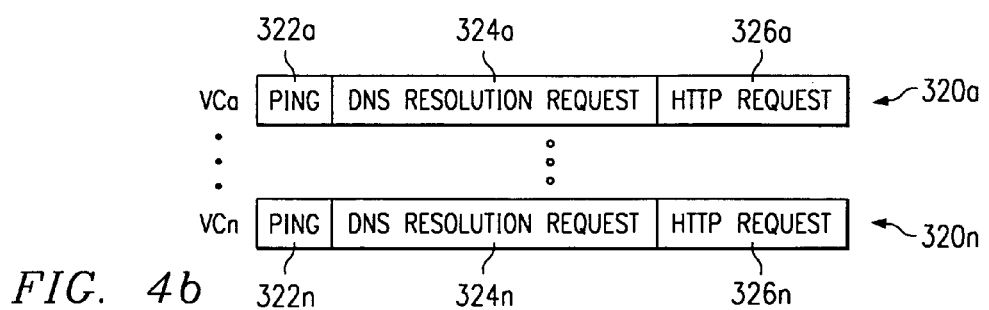

FIGS. 4a-4b are block diagrams of exemplary signals useful in configuring and performing diagnostic testing of customer premise equipment. FIG. 4a shows signal blocks 310a-310n. In this embodiment, each block 310 includes an F5 loopback packet 312, a PPP VCMUX LCP packet 313, PPPoE PADI packet 314, a DHCP request packet 316, and a PPP LLC LCP configuration request packet 318. In this example, each block 310 comprises one copy of packets 312-318. Alternatively, each block 310 could include multiple copies of each packet 312-318. This embodiment could be useful, for example, in providing redundancy in the event that one of the packets is inadvertently dropped during communication. Packets 312-318 could be communicated with no delay between packets as shown in FIG. 4a, or could be separated by some amount of delay.

Communicating multiple protocol signals back-to-back in a single block allows the system to investigate multiple protocols approximately simultaneously. In a particular embodiment, each block 310a-310n is communicated over an separate virtual channel VCa-VCn approximately simultaneously. This feature provides a mechanism for testing a plurality of protocols over a plurality of virtual channels approximately simultaneously. These feature enhance the speed of identifying valid virtual channels and valid protocols associated with those virtual channels.

FIG. 4b shows a plurality of signal blocks 320a-320n, each operable to be transmitted over a virtual channel VCa-VCn. Each of blocks 320 includes a plurality of a diagnostic signals 322-326. In the illustrated embodiment, each block 320 includes a PING signal 322, a DNS resolution request 324, and an HTTP request 326. Other diagnostic signals could be used without departing from the scope of the invention. Communicating multiple diagnostic signals 322-326 back-to-back with little or no delay between signals provides an advantage of testing a plurality of network characteristics approximately simultaneously. In addition, in a particular embodiment, separate test blocks 320 can be communicated over a plurality of virtual channels approximately simultaneously. In this manner, the invention facilitates diagnosing a plurality of network characteristics over a plurality of virtual channels approximately simultaneously. This feature results in significant speed advantages in confirming various layer connectivity.

Figure 5:
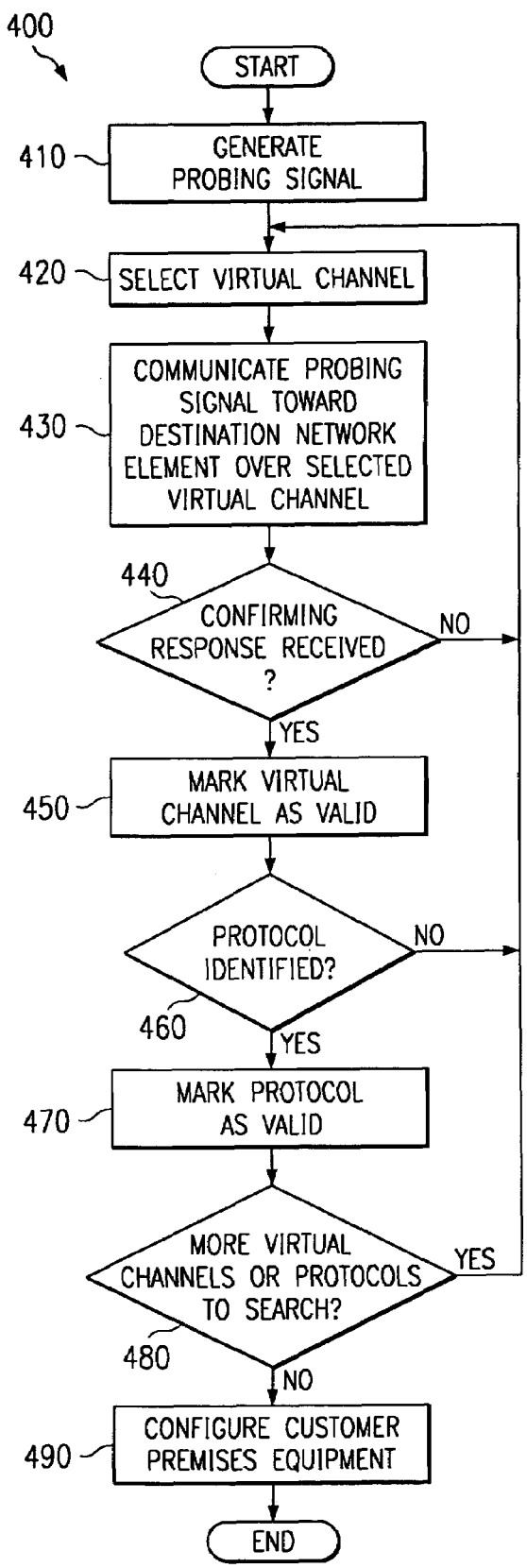
FIG. 5 is a flow chart showing one example of a method of providing automated assistance in configuring customer premises equipment according to the teachings of the present invention.

FIG. 5 is a flowchart showing one example of a method of providing automated assistance in configuring customer premises equipment. The method 400 begins at step 410 where configuration manager 222 generates a probing signal. The probing signal may comprise, for example, an F5 OAM loopback signal, a DHCP request, an LCP configuration request, a PADI request, or any other signal that can be communicated toward a destination network element and have a responsive signal returned to the sending element to thereby identify an active virtual channel and optionally a protocol associated with the virtual channel. In one embodiment, the step 410 of generating a probing signal can comprise generating a single probing signal. In an alternative embodiment, step 410 may comprise generating a plurality of probing signals to be communicated back-to-back in a single block toward a destination network element. Configuration manager 222 may generate the probing configuration signal with little or no user input. For example, configuration manager may generate the probing signal without receiving any user input, or without receiving user input identifying the active virtual channel and/or protocol.

Configuration manager 222 selects a virtual channel for transmission of the probing signal at step 420. Selection of a virtual channel may involve, for example, configuration manager 222 initially accessing a list 240 of likely virtual channels and selecting one or more channels from that list.

Configuration manager 222 then communicates the probing signal toward a destination network element over one or more selected virtual channels at step 430. This may involve, for example, configuration manager 222 spawning a plurality of threads of virtual channel/protocol discovery engine 236, one for each virtual channel being investigated. Each thread of virtual channel/protocol discovery engine 236 communicates the probing signal toward a destination network element and awaits receipt of a response. In a particular embodiment, virtual channel/protocol discovery engine 236 waits only a portion of a time out period associated with the probing signal before communicating another probing signal over the same virtual channel. For example, virtual channel/protocol discovery engine 236 may wait one half of a time out period associated with the probing signal before communicating another probing signal over the same virtual channel. In still another embodiment, each thread of virtual channel/protocol discovery engine 236a-236n may communicate a plurality of probing signals back-to-back. In these manners, a plurality of potential protocols can be investigated approximately simultaneously.

For each virtual channel returning a confirming response to the probing signals, configuration manager 222 marks the associated virtual channel as valid at step 440. Marking the associated virtual channel as valid may comprise, for example, creating a list of valid virtual channels and storing that list in memory 224. Alternatively, marking the virtual channel as valid may comprise, for example, automatically configuring customer premise equipment 220 for operation on one of the valid virtual channels.

Configuration manager 222 determines at step 460 the protocol associated with any responses to the probing signals. This may involve, for example, looking for a particular pattern of information associated with a particular protocol. Configuration manager 222 marks each identified protocol as valid at step 470. This may involve, for example, creating a list of valid protocols and storing that list in memory 224, and/or automatically configuring customer premises equipment 220 for operation with one of the identified valid protocols.

Configuration manager 222 determines at step 480 whether there are additional virtual channels or protocols to search. If, at step 480 no valid virtual channels or protocols have been identified, and there are additional virtual channels or protocols to be searched, configuration manager 222 returns to step 420 to select another virtual channel to search. In a particular example, configuration manager 222 may have invoked basic search engine 232 to search a list of virtual channels likely to return a response, and fail to identify any valid virtual channels. In that case, configuration manager 222 may invoke extended search engine 234 to search virtual channels, for example, in extended list file 242 and memory 224. Configuration manager 222 performs the analysis described in steps 430-480 on another group of virtual channels. This process continues until all virtual channels have been exhausted, or configuration manager 222 receives an interrupt command directing termination of the search.

configuration manager 222 assists in a configuration of customer premises equipment 220 at step 490. This may involve, for example, presenting a user with a list of valid virtual channels and/or valid protocols. As another example, this may involve configuration manager 222 automatically selecting a virtual channel and/or protocol from the identified valid virtual channels and protocols. Configuration manager 222 may make this selection based, for example, on a set of predetermined criteria establishing preferred virtual channels and/or protocols.

Figure 6:
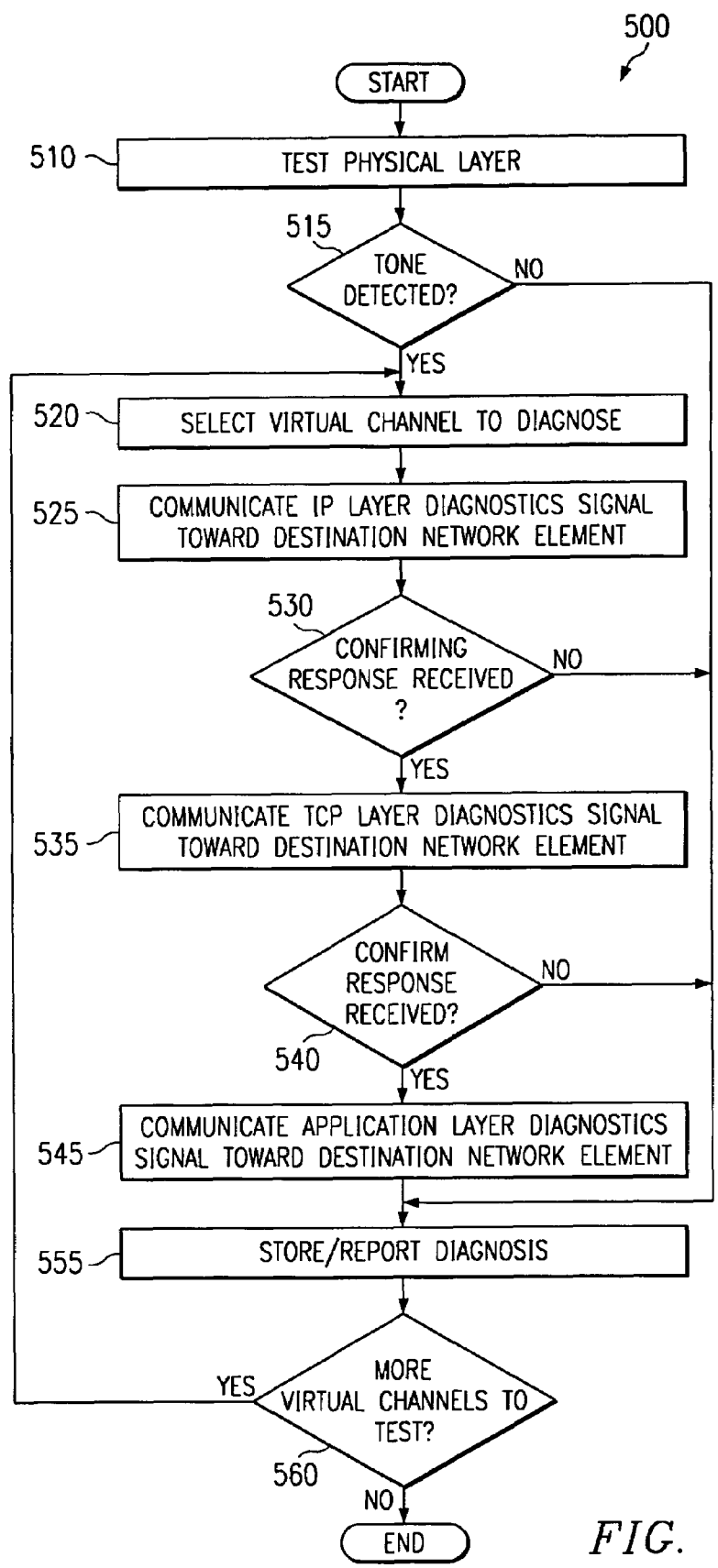
FIG. 6 is a flowchart showing one example of a method of diagnosing faults in the operation of customer premise equipment according to the teachings of the present invention.

FIG. 6 is a flowchart showing one exemplary method of diagnosing faults in the operation of customer premises equipment. The method 500 begins at step 510 where configuration manager 222 tests a physical layer connecting customer premises equipment 220 to external network elements, such as central office equipment 50 shown in FIG. 1. Configuration manager 222 may, for example, test connection with central office equipment by determining whether a tone exists on communication link 40 coupling customer premises equipment 220 to central office equipment 50. If a tone is detected at step 515, configuration manager 222 selects a virtual channel to diagnose at step 520. This selection may be similar to step 420 described above with respect to FIG. 5.

Configuration manager 222 communicates an IP layer diagnostic signal toward a destination network element at step 525. In a particular example, the IP layer diagnostic signal may comprise a PING SIGNAL 114 communicated to a gateway router 174. Configuration manager 222 awaits receipt of a confirming response signal, such as an IP address from gateway router 174 at step 530.

configuration manager 222 also communicates a TCP layer diagnostic signal toward a destination network element at step 535. The TCP layer diagnostic signal may comprise, for example, a DNS resolution request. Configuration manager 222 awaits receipt of a confirming response, such as a DNS resolution at step 540.

Configuration manager 222 also communicates an application layer diagnostic signal toward a destination network element at step 545. The application layer diagnostic signal may comprise, for example, an HTTP request to a well established Internet site. Configuration manager 222 awaits receipt of a confirming response.

Configuration manager 222 may communicate IP layer, TCP layer and application layer diagnostic signals individually or back-to-back. Configuration manager 222 may store results of responsive signals received or not received and/or use those results to provide diagnostic analysis at step 555. Configuration manager may repeat method 500 for additional virtual channels at step 560.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of providing automated assistance in configuring customer premises equipment for communication with service provider network element, comprising:
   automatically identifying a first valid protocol, a first valid channel, a second valid protocol, and a second valid protocol for configuration with the customer premises equipment without a user intervention; and
   assisting the user in configurating the customer premises equipment for use with the identified valid protocols;
   wherein automatically identifying the valid protocols for configuration with the customer premises equipment comprises:
   communicating toward a first service provider network element a first probing configuration signal;
   receiving a response to the first signal;
   identifying the first valid protocol and first valid channel via the response from the first signal;
   communicating toward a second service provider network element a second probing configuration signal;
   receiving a response to the second signal;
   identifying the second valid protocol and second valid channel via the response from the second signal,
   wherein the first and second valid protocols are different protocols, and
   wherein the CPE is configured with the first valid protocol, the first valid channel, the second valid protocol, and the second valid channel,
   wherein communicating the probing configuration signal comprises communicating the probing configuration signal over a plurality of virtual channels, each virtual channel being a logical signal connection,
   wherein communicating the probing configuration signal comprises communicating a plurality of probing configuration signals approximately simultaneously,
   wherein communicating a plurality of probing configuration signals approximately simultaneously comprises:
   spawning a plurality of threads, each thread operable to process signals associated with a virtual channel;
   communicating a probing configuration signal over a plurality of virtual channels; and
   monitoring the probing configuration signal associated with each virtual channel using a separate thread.

2. The method of claim 1, wherein one of the probing configuration signals comprises an F5 Operations, Administration, and Maintenance loopback signal.

3. The method of claim 1, wherein one of the probing configuration signals comprises a signal having a self configuring protocol.

4. The method of claim 3, wherein one of the probing configuration signals comprises a Dynamic Host Configuration Protocol request, a Link Control Protocol Configuration Packet, or a Point-to-Point Over Ethernet (PPOE) PADI packet.

5. The method of claim 4, wherein one of the valid protocols comprises an Internet over ATM protocol.

6. The method of claim 4, wherein one of the valid protocols comprises a Point-to-Point over Asynchronous Transfer Mode protocol or a Point-to-Point over Ethernet protocol.

7. The method of claim 1, wherein a predefined look-up table is not read order to identify the first and second valid protocols.

8. A computer readable medium operable to execute the following steps on a processor of a computer:
   automatically identifying a first valid protocol, a first valid channel, a second valid protocol, and a second valid protocol for configuration with the customer premises equipment without a user intervention; and
   assisting the user in configuring the customer premises equipment for use with the identified valid protocols;
   wherein automatically identifying the valid protocols for configuration with the customer premises equipment comprises:
   communicating toward a first service provider network element a first probing configuration signal;
   receiving a response to the first signal;
   identifying the first valid protocol and first valid channel via the response from the first signal;
   communicating toward a second service provider network element a second probing configuration signal;
   receiving a response to the second signal;
   identifying the second valid protocol and second valid channel via the response from the second signal,
   wherein the first and second valid protocols are different protocols, and
   wherein the CPE is configured with the first valid protocol, the first valid channel, the second valid protocol, and the second valid channel,
   wherein communicating the probing configuration signal comprises communicating the probing configuration signal over a plurality of virtual channels, each virtual channel being a logical signal connection,
   wherein communicating the probing configuration signal comprises communicating a plurality of probing configuration signals approximately simultaneously,
   wherein communicating a plurality of probing configuration signals approximately simultaneously comprises:
   spawning a plurality of threads, each thread operable to process signals associated with a virtual channel;
   communicating a probing configuration signal over a plurality of virtual channels; and
   monitoring the probing configuration signal associated with each virtual channel using a separate thread.

9. The method of claim 8, wherein user intervention is a responding to a prompt of a Graphical User Interface.

10. The computer readable medium of claim 8, wherein the probing configuration signal comprises an F5 Operations, Administration, and Maintenance loopback signal.

11. The computer readable medium of claim 8, wherein the probing configuration signal comprises a signal having a self configuring protocol.

12. The computer readable medium of claim 8, wherein communicating the probing configuration signal over a plurality of virtual channels comprises communicating the signal over plurality of virtual channels likely to return a response.

13. The computer readable medium of claim 8, wherein communicating the probing configuration signal comprises:
   communicating the signal over a first virtual channel; and communicating the signal over a second virtual channel before a time out value associated with the signal communicated over the first virtual channels expires.

14. The computer readable medium of claim 8, wherein communicating the probing configuration signal comprises:

communicating a first probing communication signal over a virtual channel; and communicating a second probing configuration signal over the same virtual channel before a time out value associated with the first probing configuration signal expires.

15. The computer readable medium of claim 8, wherein communicating the probing configuration signal comprises communicating over a virtual channel a plurality of probing configuration signals, each signal associated with a different protocol.

16. The method of claim 8, wherein a predefined look-up table is not read in order to order identify the valid protocol.

17. The method of claim 1, wherein user information is a responding to a prompt of a Graphical User Interface.

* * * * *